United States Patent [19]

Hsu et al.

[11] 4,228,529
[45] Oct. 14, 1980

[54] METHOD FOR DISPLAYING SEISMIC DATA

[75] Inventors: I-Chi Hsu; Anne L. Simpson, both of Houston, Tex.

[73] Assignee: Western Geophysical Co. of America, Houston, Tex.

[21] Appl. No.: 16,234

[22] Filed: Feb. 28, 1979

[51] Int. Cl.$^3$ .............................................. G01V 1/34
[52] U.S. Cl. ...................................... 367/70; 367/68; 367/74
[58] Field of Search .............................. 367/68, 70, 74

[56] References Cited

U.S. PATENT DOCUMENTS 3,946,356  3/1976  Anstey .................................. 367/68

Primary Examiner—Howard A. Birmiel
Attorney, Agent, or Firm—William A. Knox

[57] ABSTRACT

A two dimensional display is prepared representing a cross section of the earth and designed to establish natural data lineations. The vertical axis is marked in terms of a parameter of depth below the earth's surface and along the horizontal axis, are marked seismic receiver stations. For each station, a graph of an intrinsic lithologic property as a function of depth is computed and plotted beneath the corresponding station. Contour crossing points are determined at unit intervals along the plotted graph together with the sign of the corresponding derivative. Contour crossing points, beneath adjacent stations, that match as to numerical value and derivative sign are connected by contour segments. Shading patterns are applied to the zones between contour segments to enhance the natural lineation of the chosen intrinsic lithologic function.

9 Claims, 6 Drawing Figures

METHOD FOR DISPLAYING SEISMIC DATA

BACKGROUND OF THE INVENTION

1. Field of the Invention

This invention relates to the art of exhibiting variations of a set of data values on a two coordinate display by shaded contouring. The method is particularly applicable to data that is inherently lineated in one coordinate and which has been sampled at regular intervals along the other coordinate.

2. Discussion of the Prior Art

In the well-known practice of seismic exploration using the reflection technique, an acoustic wave is generated at regularly-spaced stations along a line of survey. The travel times of the acoustic waves from the respective generating stations at the surface to the subsurface rock layers are measured. The measured travel times are then plotted on a two-dimensional display as a function of travel time (or depth) along the vertical axis and as a function of horizontal distance of the generating stations or shot points along the horizontal X axis corresponding to the line of survey. The display may be plotted as a variable density, variable area or wiggle-trace section. Shading or colors may be superimposed on the display to further emphasize relative signal amplitues, frequencies, or both. The display represents a cross section of the earth showing the structural attitudes of the subsurface rock layers. The structure of the layers is an extrinsic parameter of the layers. That is, the inherent properties of the rock layers are not substantially altered by the structural attitude of the layers.

In order to properly interpret the structural section, other important attributes of the rock layer must be known such as the porosity and fluid content. These attributes can be deduced from knowledge of certain intrinsic properties of the rock layers, such as the acoustic interval velocity, acoustic attenuation and acoustic impedance. Accordingly, the structural section is often supplemented with a cross section showing the variations of a selected intrinsic rock property as a function of reflection time or depth. Typically the inherent rock properties tend to be highly lineated and consistent along the X coordinate. That is, the function describing the inherent rock property varies slowly along the X coordinate but it may change relatively rapidly in the vertical direction along the Y axis.

A visual display of lateral trends and variations of an exemplary lineated rock property may be enhanced by contouring and shading. Such contouring may be, and often is, done by hand or it can be automated. Automated contouring programs generally fit a curve, such as a cubic spline curve, to the data. In such a process all of the data values within a specified zone are considered even though some or many of the data values may be erroneous due to noise contamination of the original signal.

Usually the lineations are relatively thin along a vertical depth scale. Because undue weight tends to be applied by the contour program to erratic data values, the displayed lineations tend to become blurred at their upper and lower boundaries. The overall display lacks resolution across lithologic units. One type of such a cross section is illustrated on page 18 of the January, 1979 issue of *Geophysics,* published by the Society of Exploration Geophysicists, Tulsa, Oklahoma.

SUMMARY OF THE INVENTION

It is an object of this invention to provide a display of lineated data, such as varying rock properties, that provides crisp resolution across lithologic boundaries.

It is a further object of this invention to provide a method for unbiased correlation of lineated data, taking into account the directivity field of the data.

It is yet a further object of this invention to provide a method for correlation of lineated data that will allow erratic data to be easily recognized.

In an aspect of this invention, a plurality of data sampling points are established at intervals along the horizontal X axis of a two dimensional display. The data values representing the varying magnitude of a selected intrinsic rock-layer property are plotted along the vertical Y axes of each sampling point as a function of unit time or depth. Contour crossing points are established along the Y axes of a first pair of adjacent sampling points at desired contour intervals. Matching values along the Y axes of two adjacent profiles are then joined by straight-line contour segments. Contour crossing points at one sampling point that have no corresponding mate in an appropriate vicinity of an adjacent sampling point, are terminated midway between the adjacent sampling points.

The areas between any two neighboring contour segments, and between the Y axes of the adjacent sample points, form trapezoids, the top and bottom of each of which are defined by the contour segments and may be emphasized or marked. The lateral boundaries of the trapezoids are left unmarked. A shading pattern having a desired characteristic is applied to the area enclosed by a first trapezoid and other shading patterns having other characteristics are applied to other trapezoidal areas above and below the first trapezoid. The above operations are repeated between the Y axes of second and third sampling points, third and fourth sampling points, etc. until all of the plurality of sampling points have been processed. The slope of a midway-terminated contour segment is adjusted to match approximately the slope of its nearest neighboring connected contour segment.

Since the data values being contoured are generally highly lineated and consistent from sample point to sample point, the unmarked lateral boundaries of corresponding trapezoids included between successive pairs of adjacent sample points will blend together to form a continuous feature across the display. Contour crossing points that apparently match are connected only when the slope of the connecting contour segment is equal to or less than a limiting value that is determined by a function of the slope of the natural lineation of the data to be displayed. The shading patterns may consist of varying shades of grey or they may be displayed as colors of varying hues and/or saturations.

BRIEF DESCRIPTION OF THE DRAWINGS

These and other objects and advantages of this invention will be better understood from the appended detailed description and the drawings wherein.

DETAILED DESCRIPTION OF THE PREFERRED EMBODIMENT

Figure 1:
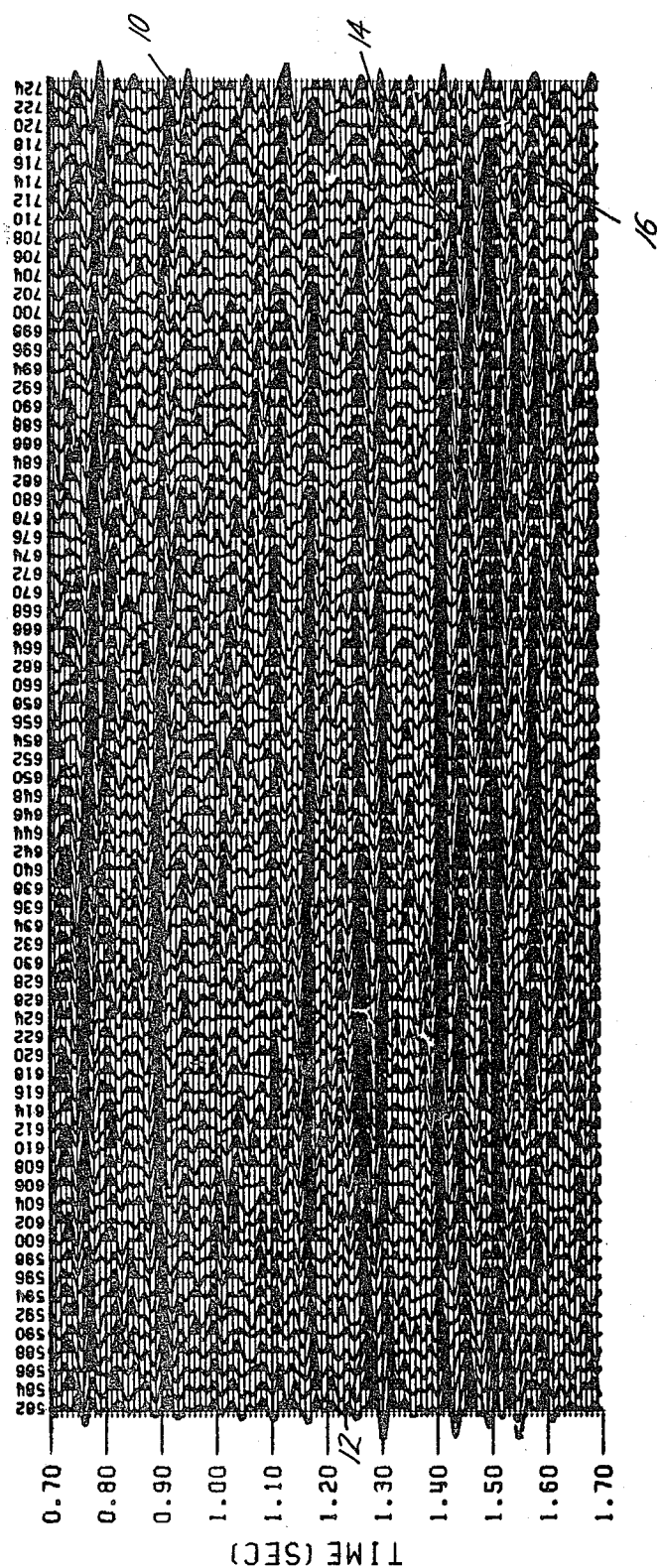
FIG. 1 is a seismic structural section.

Referring now to FIG. 1 there is shown a portion of a conventional variable area seismic cross section. The vertical Y axis is reflection time measured in seconds. The vertical coordinates of the section span the reflection time interval from 0.7 to 1.7 seconds. The horizontal X axis represents lateral distance along the line of profile. Each station that is marked along the X axis represents a data sampling point or shot point which is equivalent, in this case, to a CDP stack point, from station 582 on the left to station 724 on the right. The black lineations such as 10, 12, 14, 16 are strong reflected seismic signals that show the structural relief of the reflecting interfaces whence the reflections originated. Weaker and relatively discontinuous reflections appear elsewhere on the section. Of particular interest is reflection 16 which appears at a reflection time of about 1.53 seconds. This reflection, which will be discussed in more detail later appears as a strong continuous reflection across the entire section with practically no breaks.

The operations of gathering seismic reflection information in the field, including CDP or common depth point techniques, processing the field data, and providing finished variable area or variable density structural seismic sections is very well known and is described at length in standard textbooks such as *Introduction to Geophysical Prospecting* by Milton B. Dobrin, pages 17-291, published by McGraw Hill Book Co. Accordingly, in the interest of brevity the above well known steps will not be discussed further.

The amplitude of a seismic reflection is a function of the acoustic impedance of the rock layers above and below the reflecting interface. The acoustic impedance attributable to a rock layer is defined as the product of the interval velocity and the density of that rock. The reflection coefficient is proportional to the ratio formed by dividing the difference between the acoustic impedances of two rock layers by the sum of their impedances. If therefore, the density of the rock layers is known or if it can be determined empirically, then, knowing the true amplitude of the reflection signals from a structural section (such as FIG. 1) the interval velocity attributable to each rock layer can be computed. See for example, U.S. Pat. No. 3,946,356 to Anstey.

Interval velocity is the velocity of propagation of an acoustic wave within a specified rock layer. Interval velocity should not be confused with the average velocity of an acoustic wave propagating from the earth's surface to a specified subsurface rock layer. Neither should it be confused with the apparent velocity of a wave front emerging at the surface of the earth.

As previously discussed, the interval velocity attributable to a particular rock layer is related to the type of rock, its porosity, fluid content, and cementation. A porous rock filled with a gas is likely to have a lower interval velocity than a non-porous rock. Particulate rocks such as sandstones and shales usually have a lower interval velocity than a tight evaporite such as limestone. Furthermore, it will be appreciated that a lateral change in the interval velocity of a given rock layer is indicative of a change in a characteristic property of the rock such as a gradual change in its composition, porosity or fluid content.

In summary, a structural seismic section shows a cross section of the topography of the subsurface rock layers. A companion cross section that shows lateral changes in the interval velocities of the respective rock layers is diagnostic of internal changes in the intrinsic physical characteristics of the layers. Such knowledge of the physical characteristics is important for example, in finding stratigraphic traps caused by a localized increase in porosity wherein oil or gas can accumulate. As is well known, such stratigraphic traps are not necessarily structurally controlled and hence may not be recognizable on a conventional structural seismic section. See for example, U.S. Pat. No. 3,662,325, assigned to the assignee of this invention, the teachings of which may be applied to this invention.

The method of this invention is designed to provide shaded contour profiles of functions that exhibit a strong and fairly consistent lineation, i.e. where the value of the function to be contoured varies slowly in one coordinate direction such as along the lateral X axis and rapidly or slowly in the other coordinate direction along the vertical Y axis. For example most geologic parameters in sedimentary basins very slowly in the horizontal direction and relatively rapidly vertically.

It is assumed that a desired lineated function may be represented as a series of profiles or graphs plotted in terms of a function of some measurable rock property such as interval velocity vs depth or reflection time along the vertical Y axis. In a seismic survey, a plurality of such profiles are distributed along the X axis as shot points spaced apart from each other by substantially constant separations. Generally, the Y axis is considered to extend as a straight line, vertically downwards from the surface beneath each shot point. However, due to ray geometry and dip migration considerations, the Y axis may follow a curved path.

Figure 2:
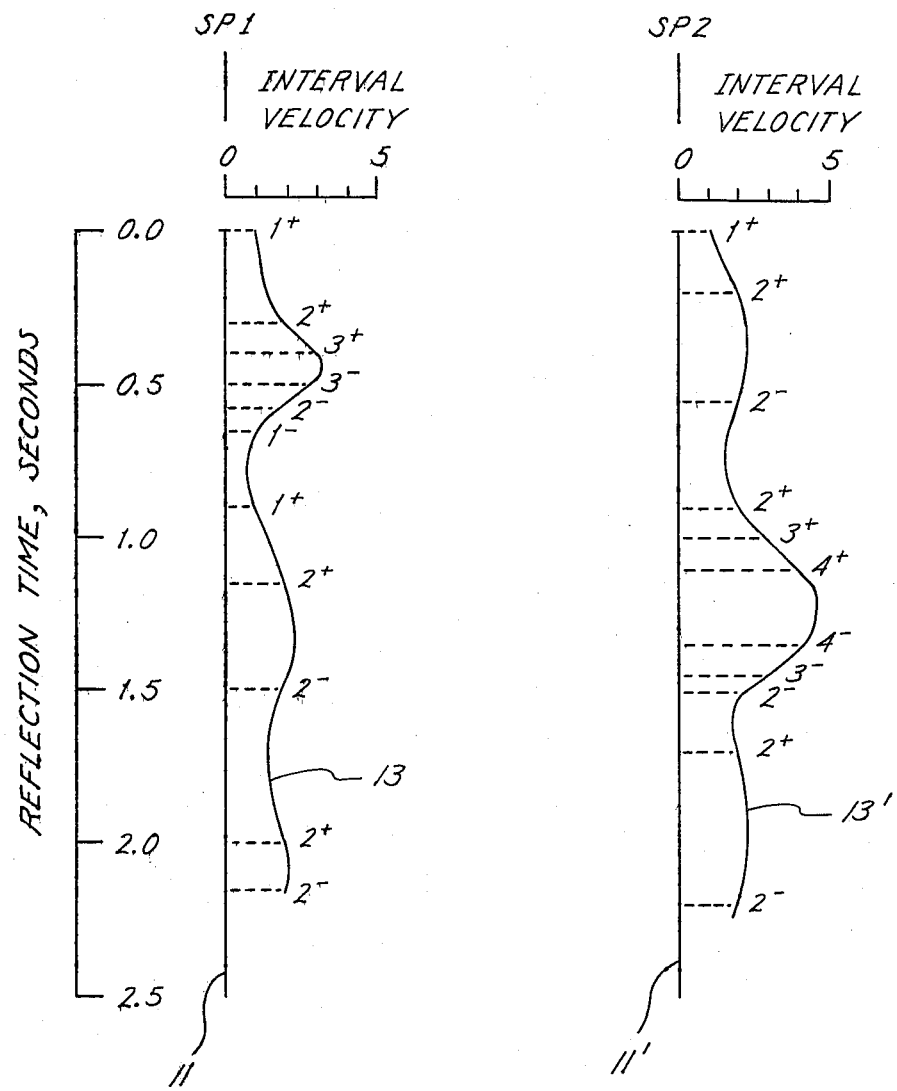
FIG. 2 illustrates graphs of interval velocity as a function of reflection time for two adjacent shot points.

Referring now to FIG. 2, there are shown two graphs of rock-layer interval velocity at two adjacent shot points, SP1 and SP2, plotted as a function of a vertical depth parameter such as two-way reflection travel time. The vertical lines 11, 11' are reference lines projected vertically beneath each sampling point or shot point, SP1, SP2. Wiggly lines 13, 13' are graphs of the interval velocity vs reflection travel time beneath each sampling point. For convenience, zero on the interval velocity scale is referred to an arbitrary base value such as 10,000 feet per second. Thus, for curve 13', the interval velocity ranges from about 11,000 feet per second to 14,500 feet per second.

The processing of a pair of profiles proceeds as follows: The values along each profile are scanned to determine all the Y positions at which preselected unit numerical data values or contour levels occur. These Y positions are called contour crossing points or CCPs such as those marked 2+, 2−; 3+, 3−; 4+, 4− in FIG. 2. The numerical value represents the datum value; the sign is the slope of the curve at the selected datum value. Each CCP is recorded along with the algebraic sign of the derivative or slope of the function with respect to Y. The numbers 2+, 2−; 3+, 3−; 4, etc. in FIG. 2 represent arbitrary, illustrative contour values. Referred to the arbitrary reference of 10,000 feet per second, these numbers represent interval velocities of 12,000, 13,000, 14,000 feet per second.

Figures 3, 4:
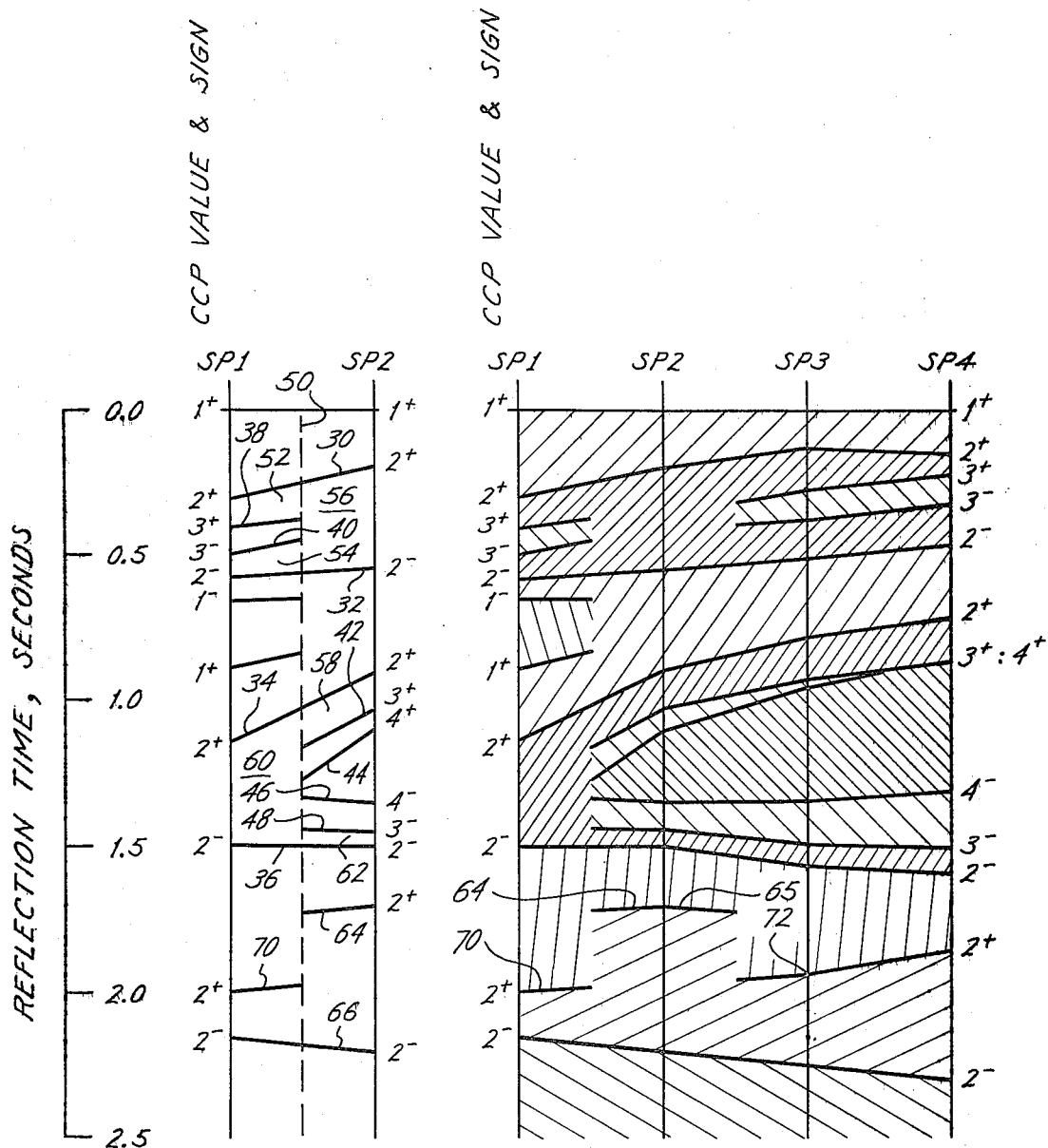
FIG. 3 illustrates the method of connecting correlative contour crossing points between adjacent shot points by contour segments.
FIG. 4 shows a series of shot points wherein lineated trends are defined by open-ended shaded contouring.

In FIG. 3, SP1 and SP2 have been moved closer together, to better match true horizontal and vertical scales and the contour crossing points from FIG. 2, along with their derivative signs, have been copied to FIG. 3 along the vertical reference axes 11, 11'.

For perfectly lineated data (e.g. exactly horizontally layered strata) the lists of CCPs for a pair of profiles would be identical. Each CCP of one profile would match exactly in position and derivative sign with a corresponding CCP of the other profile. Accordingly it is reasonable to expect that, with imperfectly lineated data, for most of the CCPs of one profile, there should be a good chance of finding a corresponding CCP on the other profile at about the same Y value. Every time such a correspondence is found, a contour line segment such as 30, 32, 34, 36 can then be drawn from one profile to the other, such as from SP1 to SP2. It will then be possible to shade above and below that line to emphasize the boundary as more completely described herein below.

If all of the CCPs of the profiles can be so matched, a consistent, continuous display of the result may be had. But if only some of them match then there is the problem of what to do with the remainder. In such a case, contour segments such as 38-48 are extended from each of these unmatched CCPs to the profile midline 50, extending along a direction controlled by the closest neighboring CCPs which do pair up, as illustrated in FIG. 3.

FIG. 4 illustrates the method of shading, and it will be further observed that additional shot points SP3 and SP4 have been added. As pointed out earlier, the basic processing is by successive pairs of adjacent profiles, such as SP1 and SP2, SP2 and SP3, SP3 and SP4, to produce the the contour lines and shading relevant to the area lying between the members of each profile pair. For shading purposes it is convenient to group the information as a plurality of well defined trapezoids, which may be shaded by shading patterns having different textures or characteristics for each trapezoid within the inter-profile region as shown in FIG. 4. The top and the bottom of each of the trapezoids may be darkened or reinforced as by a heavy line as is also illustrated in FIG. 4. Notice that the sides of the trapezoids 52, 54, 56, FIG. 3 are unmarked and merge visually into a single region as shown in FIG. 4, between SP1 and SP2 and similarly for trapezoids 58, 60, 62. Thus the contouring is an open-ended, incremental procedure.

Much of the work of contouring lies in the details of searching for the correspondences between CCPs of any two profiles, taking into account the fact that there often exist directivity trends of the lineation that are somewhat different from the horizontal.

For the moment assume that an a-priori directivity field has been determined in the region between the two profiles. This is in the form of a continuous, slowly varying function of Y such that, for every CCP on one profile the directivity function can be used to predict at what Y value a corresponding CCP on the other profile should be found. One can then go to that predicted Y value and search in its vicinity for such a correspondence. More precisely however, what is done is to project, according to the directivity field, all CCPs from both profiles to the midline between the two profiles, and then search for close correspondences among these midline projections.

In general, the rules for a CCP match follow the rules of conventional topographic-type contouring. The tests for a CCP match are (1) they must have the same datum value or contour level and derivative sign, (2) the vertical separation along the Y axis of their midline projections, must be less than a selected absolute limiting value of the depth parameter, (3) no other midline projection may lie between those of the pair in question, and (4) no contour segment may cross another contour segment, and (5) for every datum value, there must exist a second, exactly equal datum value with opposite algebraic sign. There is however one important exception to conventional contouring rules, namely, contours having the same contour level with oppositely-signed derivatives do not necessarily close either on or off the display section. They are open-ended.

The result of a first trial for matching CCPs will, in general, be some good CCP matchings plus some leftover unmatched CCPs. However the directivity field can be readjusted so that it exactly honours the matchings previously found and then start a new search of the unmatched CCPs using the new directivity field. Several iterations may be necessary before no further matchings are found.

The initial directivity field can either be specified as zero (horizontal layers assumed) or the directivity field can be estimated by inspection of the associated seismic structural section or from known geological trends. Alternatively, zoned cross-correlation between the sampling points may yield a sequence of directions between zone centers and then a linear interpolation of the directivity elsewhere.

After no further matchings can be found, elementary contour pinchouts that might occur between the profiles may be sought out. Thus in FIGS. 3 and 4 at SP1, the umatched CCPs 38 and 40 imply a pinchout or wedging of contour levels 3+, 3−, between the profiles. At SP2 the unmatched CCPs 42, 44, 46, 48 imply a pinchout at levels 4+, 4−, between the profiles. When an elementary pinchout or wedging is detected, two actions may be taken for improvement of the visual effect: (1) the midpoint projections of the two CCPs involved are moved towards each other, so they are about half as far apart as they were , and (2) the corresponding mid-profile lateral boundary of the corresponding trapezoid may be marked.

Open-ended contouring has a number of advantages, one of which is that display artifacts due to erratic data are less likely to be interpreted as a real structural anomaly. That is, the contouring method is unbiased. For example, refer for a moment to FIG. 4. An erratic datum 64, 65 value appears on the profile of SP2 for the 2+ contour. Blind, thoughtless contouring might cause the segments 64, 65 to be joined with segments 70 and 72. By setting a realistic limit, related to the directivity field of the data, on the slope of a contour segment between any two sampling points, such an error is avoided and the apparent anomaly betrays for what it probably is: an erratic datum value.

Figure 5:
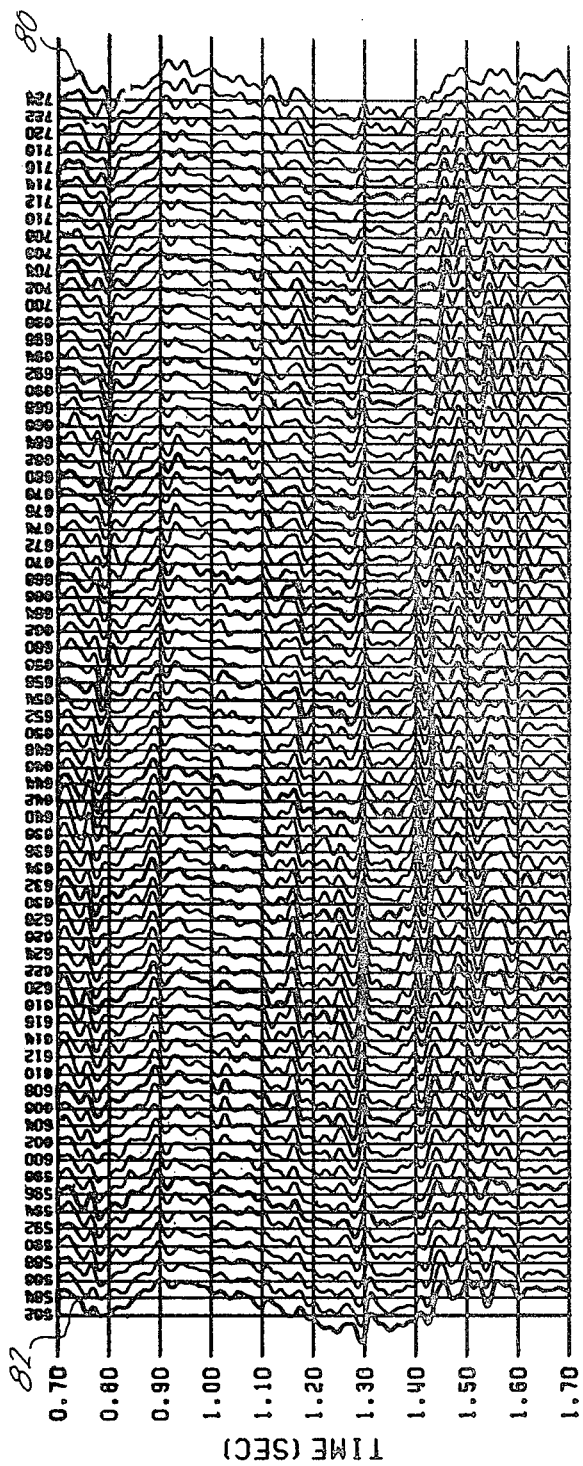
FIG. 5 is a display of interval-velocity vs reflection-time graphs corresponding to the structural cross section of FIG. 1.

FIG. 5 is a series of interval velocity graphs or profiles corresponding to each of the shot points 582-724 of the structural section of FIG. 1. The rightmost wiggly line 80, belongs to SP724; the leftmost wiggly line 82, belongs to SP582. Each interval velocity graph is approximately averaged about the vertical reference line beneath each shot point. Interval velocity increases to the right. Thus, at SP724, the interval velocity decreases between 0.70 and 0.80 second, increasing to a first maximum at about 0.95 second. Thereafter a low velocity zone is seen between 1.20 and 1.40 seconds. Much higher velocities appear at 1.50 seconds and deeper. The lowest interval velocities are on the order of 11,500 feet per second and the highest velocities around 1.50 seconds are in excess of 19,500 feet per second.

In FIG. 5, it is easy to recognize gross velocity trends by inspection; but there are a number of more obscure changes that are not readily resolved.

Figure 6:
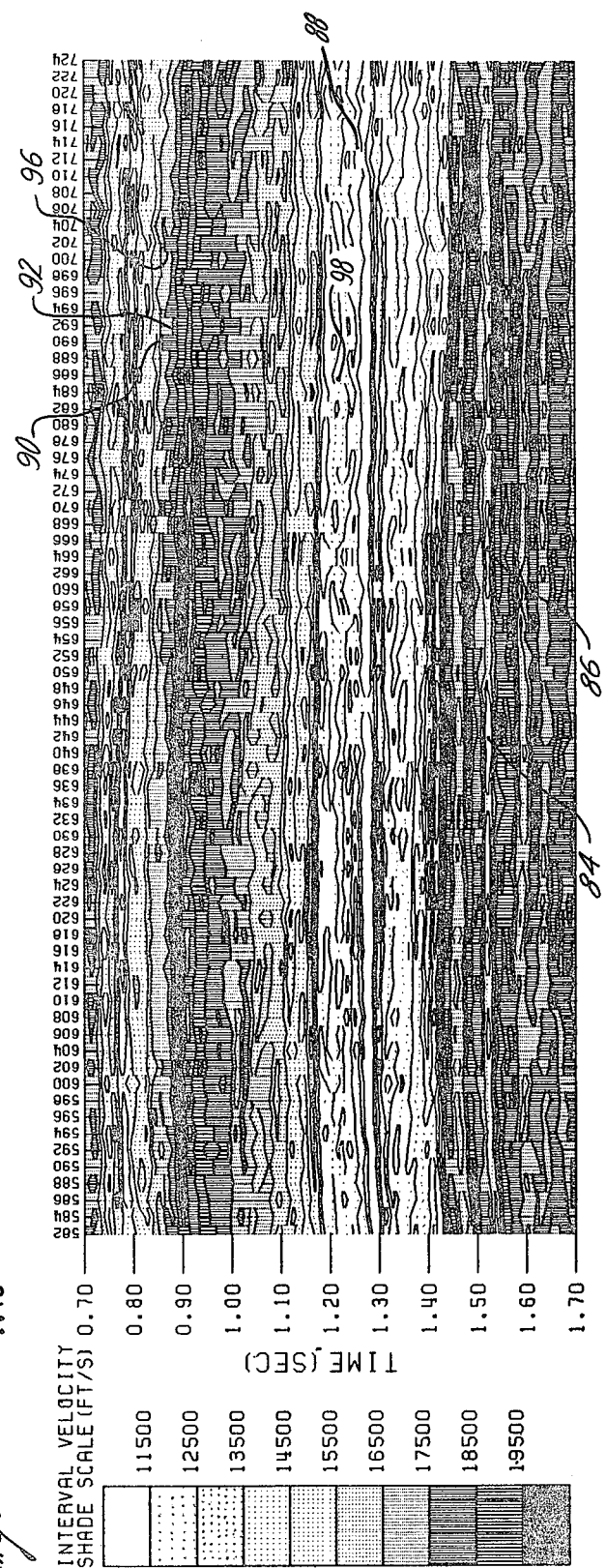
FIG. 6 shows the graphs of FIG. 5 contoured in accordance with the method of this invention.

FIG. 6 is a display of the interval velocity trends resolved by the open ended, shaded incremental contouring technique. A shading code is shown to be left of the display; the higher the velocity, the darker is the shade code. Most of the interval velocity lineations are well resolved and show consistent trends across the section. Particularly noteworthy, however, are the low-velocity stratigraphic anomalies 84, 86 at a reflection time of about 1.54 seconds between shot points 636 and 648 and between 660 and 670. Note that these thin anomalies, having an interval velocity of about 11,500 feet per second, are sandwiched between high velocity strata having an interval velocity in excess of about 17,500 feet per second. Although anomalies 84, 86 are flat and do not appear on the structure section of FIG. 1, drilling has since shown that they are pertroliferous stratigraphic traps.

Generally the higher interval-velocity zones are well resolved. However, in the region between about 1.10 and 1.40 seconds, a low velocity zone known to be composed of interfingered sands and shales, the trends are poorly defined and erratic. It is in this circumstance that the method of this invention becomes advantageous: Contour segments are not forced to tie between profiles in an effort to smooth erratic values as by splining. Discontinuous data are shown as such in an unbiased manner. It is known that many rock types such as sandy lacustrine and fluviatile deposits are inherently discontinuous. Accordingly the method of this invention is well adapted to displays of such discontinuous data. Typical discontinuities appear at SP712, such as 88; 90 and 92 at SP690 and 694; and 96 at SP700; and 98 at SP684.

Thus, the display, provided by the method of this invention tends to enhance fine details of intrinsic rock properties that are not readily apparent in a structural section and erratic data are not cosmetically smoothed.

The above invention has been disclosed in terms of shading open-ended contours by means of varying shades of grey. It will be apparent to those skilled in the art to employ colors of varying hues, saturations, and chroma to provide the required shading patterns. The above invention is to be understood as being equally applicable to the representation of any quantitative intrinsic property of rock layers and is not to be construed as limited to the specific example of interval velocity which was conveniently selected for purposes of illustration. Other variations in the method of this invention may be made without departing from the scope thereof which is limited only by the appended claims.

We claim as our invention:

1. On a two dimensional seismic display of a cross section of subsurface earth layers, said display having a generally vertical Y axis divided into desired unit parameters of depth and an X axis generally representing horizontal distance over the surface of the earth along which are marked the locations of a plurality of data sampling points spaced apart at desired distance intervals, a method for resolving lineated data comprising the steps of:
   (a) beneath each data sampling point, determining along the Y axis a graph of a desired intrinsic property of said earth layers whose numerical data values change as a function of said depth parameter;
   (b) scanning the graphs along the Y axis of first and second adjacent data sampling points to define contour crossing points at desired unit intervals of said graphed numerical data values and determining the algebraic sign of the slope of said graph at each said contour crossing point;
   (c) connecting, by marked contour segments between said adjacent data sampling points, contour crossing points that match as to numerical data value and algebraic sign;
   (d) terminating contour segments, from one said data sampling point, at a point between said two adjacent data sampling points, when no matching contour crossing is found on the other said sampling point;
   (e) forming a plurality of trapezoids between said adjacent sampling points, the top and bottom boundary of each said trapezoid being defined by neighboring contour segments, the lateral boundaries being defined by the respective Y axes; and
   (f) applying a shading pattern, having a desired characteristic, within one such trapezoid and applying shading patterns having other desired characteristics to other such trapezoids.

2. The method as defined in claim 1 comprising the further step of sloping the terminated contour segments to conform, according to a desired function, to the slope of the nearest neighboring connecting contour segment.

3. The method as defined in claim 2 comprising the further steps of
   scanning the graph along the Y axis of a third data sampling point adjacent to said second data sampling point to define contour crossing points at desired unit intervals of said numerical data values and determining the slope of said graph at each said contour crossing point; and
   repeating steps (c) through (f) between second and third sampling points.

4. The method as defined in claim 3 and repeating steps (b) through (f) for the remainder of the plurality of sampling points.

5. The method as defined in claim 1 wherein matching contour crossing points are connected by contour segments only when the slopes of a connecting contour segment lies between preselected values relative to the horizontal.

6. The method as defined in claim 5 wherein the preselected values are functions of the natural lineation of the data to the displayed.

7. The method as defined by claim 1 wherein said desired shading characteristics are varying shades of grey.

8. The method as defined by claim 1 wherein said desired shading characteristics are colors of varying hues, saturations, and chroma.

9. The method as defined by claim 1 wherein the lateral boundaries of the trapezoids between any pair of adjacent sampling points are unmarked and the shading characteristic within any given trapezoid between one said pair abuts on the shading characteristic within a corresponding trapezoid formed between an adjoining pair of adjacent sampling points.

\* \* \* \* \*